US012634061B2

(12) United States Patent
Pan et al.

(10) Patent No.: US 12,634,061 B2
(45) Date of Patent: May 19, 2026

(54) INDICATION METHOD AND DEVICE, AND STORAGE MEDIUM

(71) Applicant: ZTE CORPORATION, Shenzhen (CN)

(72) Inventors: Yu Pan, Shenzhen (CN); Chuangxin Jiang, Shenzhen (CN); Zhaohua Lu, Shenzhen (CN); Bo Gao, Shenzhen (CN); Shujuan Zhang, Shenzhen (CN); Zhen He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 303 days.

(21) Appl. No.: 17/753,473

(22) PCT Filed: Aug. 27, 2020

(86) PCT No.: PCT/CN2020/111769
§ 371 (c)(1),
(2) Date: Mar. 3, 2022

(87) PCT Pub. No.: WO2021/043060
PCT Pub. Date: Mar. 11, 2021

(65) Prior Publication Data
US 2022/0330221 A1 Oct. 13, 2022

(30) Foreign Application Priority Data

Sep. 3, 2019 (CN) .......................... 201910829544.1

(51) Int. Cl.
*H04L 5/00* (2006.01)
*H04W 72/044* (2023.01)
*H04W 72/23* (2023.01)

(52) U.S. Cl.
CPC ......... *H04L 5/0044* (2013.01); *H04W 72/046* (2013.01); *H04W 72/23* (2023.01)

(58) Field of Classification Search
CPC .............. H04W 16/28; H04W 72/046; H04W 72/0406; H04W 72/23; H04B 7/0456;
(Continued)

(56) References Cited

U.S. PATENT DOCUMENTS

2018/0183503 A1 6/2018 Rahman et al.
2019/0253220 A1 8/2019 Kim
(Continued)

FOREIGN PATENT DOCUMENTS

CN 108093480 5/2018
CN 108111283 6/2018
(Continued)

OTHER PUBLICATIONS

Huawei et al., "Antenna Selection for PUSCH" Apr. 20, 2018.
(Continued)

*Primary Examiner* — Michael Thier
*Assistant Examiner* — Prince A Mensah
(74) *Attorney, Agent, or Firm* — Knobbe, Martens, Olson & Bear, LLP

(57) ABSTRACT

Provided are an indication method and apparatus, and a storage medium. The indication method includes: configuring a spatial parameter information set, wherein the spatial parameter information set is used for updating at least one of a spatial parameter of a physical channel or a spatial parameter of a physical signal at different transmission times, and the spatial parameter information set comprises a transmission configuration indicator (TCI) state set or a spatial relation information.

18 Claims, 4 Drawing Sheets

Receive the spatial parameter information set configured by the base station — S420

Update a spatial parameter of a physical channel or a spatial parameter of a physical signal at different transmission times according to the spatial parameter information set — S430

(58) Field of Classification Search
CPC ..... H04B 7/063; H04B 7/0695; H04L 5/0023; H04L 5/0048; H04L 5/0053; H04L 5/0094
See application file for complete search history.

(56) References Cited

U.S. PATENT DOCUMENTS

| | | | | |
|---|---|---|---|---|
| 2019/0306924 | A1* | 10/2019 | Zhang | H04B 7/063 |
| 2019/0313440 | A1* | 10/2019 | John Wilson | H04L 5/0053 |
| 2020/0077428 | A1* | 3/2020 | Zhou | H04L 5/0023 |
| 2020/0106498 | A1* | 4/2020 | Zhou | H04W 16/28 |
| 2020/0120640 | A1 | 4/2020 | Liu et al. | |
| 2020/0229185 | A1 | 7/2020 | Zhang et al. | |
| 2020/0314857 | A1* | 10/2020 | Pezeshki | H04W 16/28 |
| 2020/0351905 | A1* | 11/2020 | Venugopal | H04L 5/0094 |
| 2020/0359459 | A1* | 11/2020 | Kakishima | H04L 5/0023 |
| 2020/0389874 | A1* | 12/2020 | Lin | H04L 5/0096 |

| | | | | |
|---|---|---|---|---|
| 2021/0050955 | A1* | 2/2021 | Park | H04B 7/0456 |
| 2022/0110147 | A1* | 4/2022 | Li | H04L 5/0048 |
| 2022/0132327 | A1* | 4/2022 | Yang | H04W 72/0473 |

FOREIGN PATENT DOCUMENTS

| | | |
|---|---|---|
| CN | 109150269 | 1/2019 |
| CN | 109495879 | 3/2019 |
| CN | 110149700 | 8/2019 |
| CN | 110536452 | 12/2019 |
| WO | WO 2018117738 | 6/2018 |

OTHER PUBLICATIONS

International Search Report of Nov. 30, 2020 for International Patent Application No. PCT/CN2020/111769. 6 pages.
The extended European Search Report for European Patent No. 20861481.8, dated Aug. 21, 2023.

* cited by examiner

| Transmit sounding reference signal resource indicator (SRI) information | S120 |
|---|---|

Base station 1

Base station 0

Rail

UE0    UE1

Railway at
t1 moment

UE0    UE1

Railway at
t0 moment

| Configure a spatial parameter information set | S220 |
|---|---|

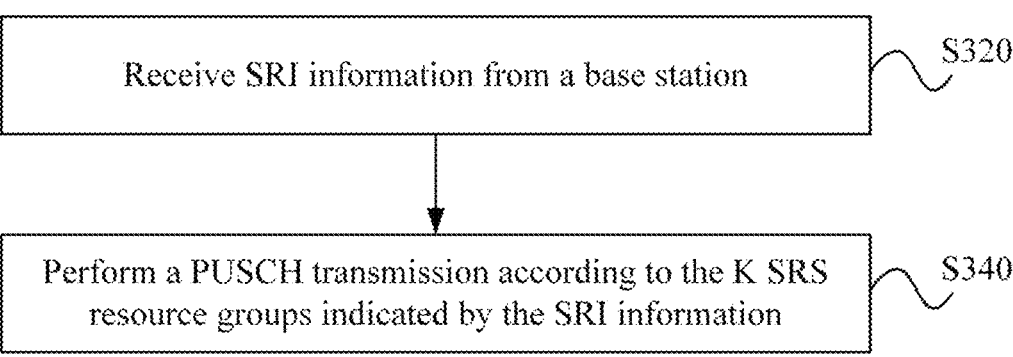

Receive SRI information from a base station — S320

Perform a PUSCH transmission according to the K SRS resource groups indicated by the SRI information — S340

FIG. 4

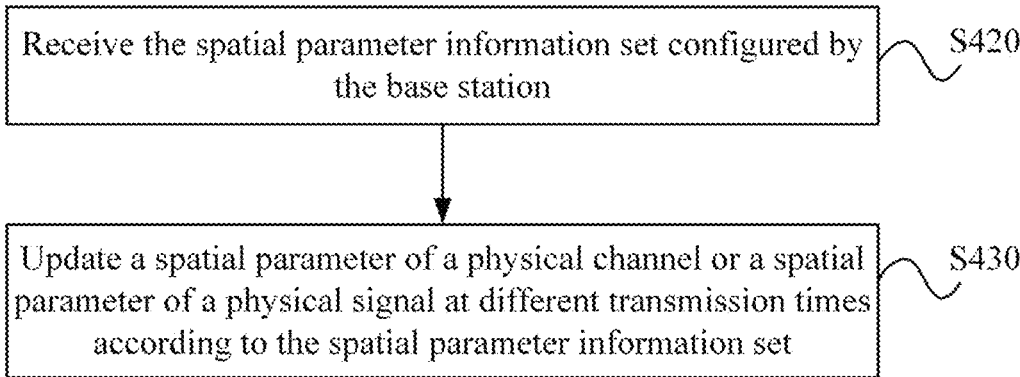

Receive the spatial parameter information set configured by the base station — S420

Update a spatial parameter of a physical channel or a spatial parameter of a physical signal at different transmission times according to the spatial parameter information set — S430

FIG. 5

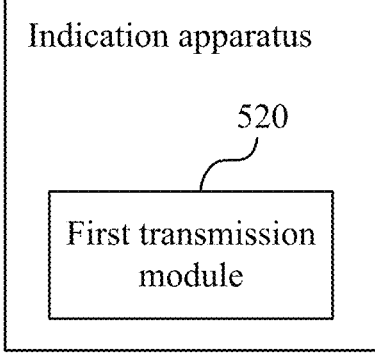

Indication apparatus

520

First transmission module

FIG. 6

INDICATION METHOD AND DEVICE, AND STORAGE MEDIUM

CROSS-REFERENCE TO RELATED APPLICATION(S)

This is a national stage application filed under 37 U.S.C. 371 based on International Patent Application No. PCT/CN2020/111769, filed on Aug. 27, 2020, which claims priority to Chinese Patent Application No. 201910829544.1 filed with the China National Intellectual Property Administration (CNIPA) on Sep. 3, 2019, the disclosure of which is incorporated herein by reference in its entirety.

TECHNICAL FIELD

The present application relates to the field of communication, and in particular, relates to an indication method and apparatus, and a storage medium.

BACKGROUND

For a beam indicator of a single uplink transmission (e.g., a physical uplink shared channel (PUSCH) transmission based on a code book (CB) or a non-code book (NCB)), a base station may indicate a transmission beam of a PUSCH by transmitting a sounding reference signal (SRS) resource indicator (SRI). For a beam indicator of multiple uplink transmissions, the base station may indicate a transmission beam of a first PUSCH by transmitting an SRI, and the transmission beam of the first PUSCH will be reused in subsequent PUSCH transmissions. However, in an ultra-reliable and low latency communications (URLLC) scene, improving the diversity gain of beams is an effective method to obtain high reliability and low latency data transmission.

SUMMARY

Embodiments of the present application provide an indication method and apparatus, and a storage medium, which improve the diversity gain of beams.

An embodiment of the present application provides an indication method. The method includes the following.

A sounding reference signal resource indicator (SRI) information is transmitted, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a physical uplink shared channel (PUSCH) or one transmission of a plurality of PUSCH retransmissions.

An embodiment of the present application further provides an indication method. The method includes the following.

A spatial parameter information set is configured, where the spatial parameter information set is used for updating a spatial parameter of a physical channel or a spatial parameter of a physical signal at different transmission times, and the spatial parameter information set includes a transmission configuration indicator (TCI) state set or a spatial relation information set.

An embodiment of the present application further provides an indication method. The method includes the following.

SRI information is received from a base station, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a PUSCH or one transmission of a plurality of PUSCH retransmissions.

A PUSCH transmission is performed according to the K SRS resource groups indicated by the SRI information.

An embodiment of the present application further provides an indication method. The method includes the following.

A spatial parameter information set is configured, where the spatial parameter information set is used for updating at least one of a spatial parameter of a physical channel or a spatial parameter of a physical signal at different transmission times, and the spatial parameter information set includes a transmission configuration indicator (TCI) state set or a spatial relation information set.

At least one of a spatial parameter of a physical channel or a spatial parameter of a physical signal is updated at the different transmission times according to the spatial parameter information set.

An embodiment of the present application further provides an indication apparatus. The apparatus includes a first transmission module.

The first transmission module is configured to transmit SRI information, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element comprises at least one of a PUSCH or one transmission of a plurality of PUSCH retransmissions.

An embodiment of the present application further provides an indication apparatus. The apparatus includes a first configuration module.

The first configuration module is configured to configure a spatial parameter information set, where the spatial parameter information set is used for updating at least one of a spatial parameter of a physical channel or a spatial parameter of a physical signal at different transmission times, and the spatial parameter information set includes a TCI state set or a spatial relation information set.

An embodiment of the present application further provides an indication apparatus. The apparatus includes a first reception module and a second transmission module.

The first reception module is configured to receive SRI information from a base station, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a PUSCH or one transmission of a plurality of PUSCH retransmissions.

The second transmission module is configured to perform a PUSCH transmission according to the K SRS resource groups indicated by the SRI information.

An embodiment of the present application further provides an indication apparatus. The apparatus includes a second reception module and an update module.

The second reception module is configured to receive a spatial parameter information set configured by a base station, where the spatial parameter information set includes a TCI state set or a spatial relation information set.

The update module is configured to update at least one of a spatial parameter of a physical channel or a spatial parameter of a physical signal at the different transmission times according to the spatial parameter information set.

An embodiment of the present application further provides a storage medium. The storage medium stores a computer program which, when executed by a processor, causes the processor to perform the indication method in any one of the preceding embodiments.

BRIEF DESCRIPTION OF DRAWINGS

FIG. 4 is a flowchart of another indication method according to an embodiment of the present application;

FIG. 5 is a flowchart of another indication method according to an embodiment of the present application;

FIG. 6 is a structural diagram of an indication apparatus according to an embodiment of the present application;

DETAILED DESCRIPTION

Figures 1, 2, 3:
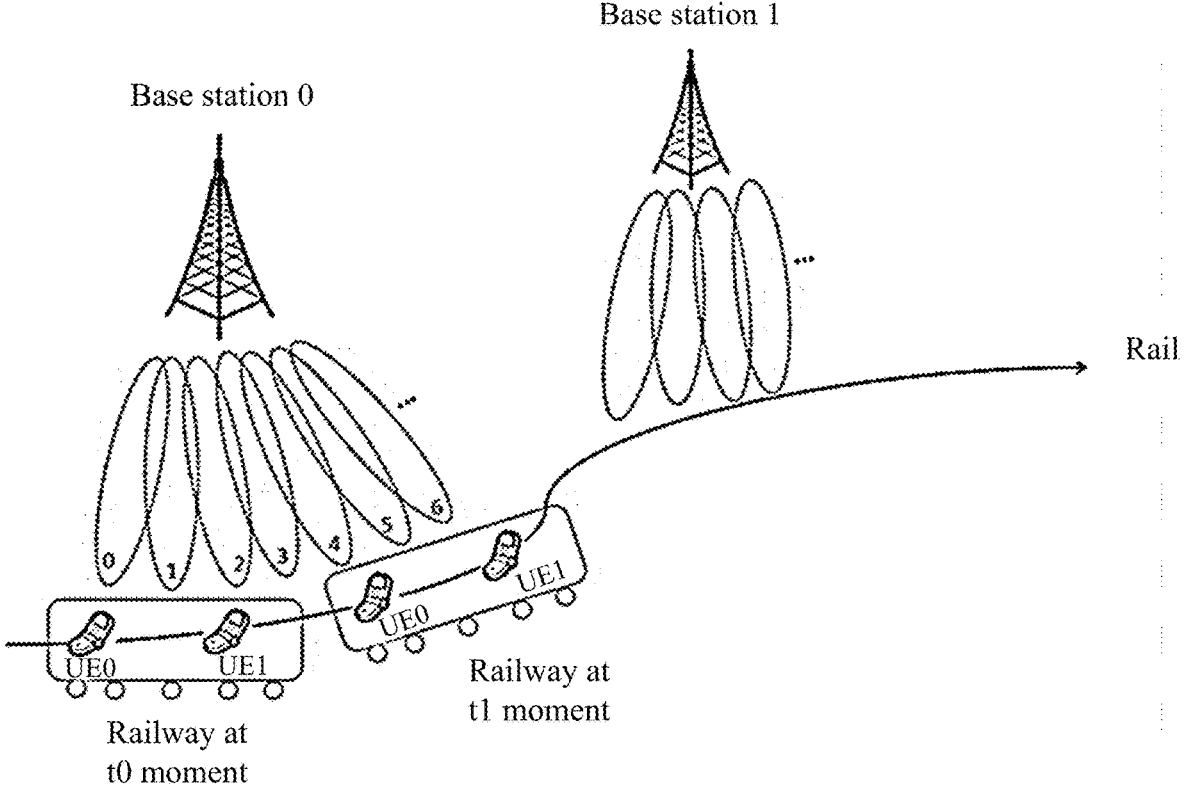
FIG. 1 is a flowchart of an indication method according to an embodiment of the present application.
FIG. 2 is a schematic diagram of a beam handover of a user equipment (UE) in a high-speed rail scene according to an embodiment of the present application.
FIG. 3 is a flowchart of another indication method according to an embodiment of the present application.

Embodiments of the present application are described hereinafter in conjunction with drawings. FIG. 1 is a flowchart of an indication method according to an embodiment of the present application. The embodiment is applicable to a case where a plurality of PUSCH transmissions are performed by using a plurality of sounding reference signal (SRS) resources, and the embodiment may be executed by a base station.

As shown in FIG. 1, the method provided by this embodiment includes S120 described below.

In S120, SRI information is transmitted.

The SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a PUSCH or one transmission of a plurality of PUSCH retransmissions. In an embodiment, the base station indicates to a UE that the K SRS resource groups perform M PUSCH transmissions. $1 < K \leq N_{SRS}$, and $N_{SRS}$ is the total number of SRS resources configured by the UE. The PUSCH transmission includes an uplink transmission based on non-codebook and an uplink transmission based on codebook. In an embodiment, the total number of SRS resources used in the uplink transmission based on non-codebook is at most 4, that is, in a case of the uplink transmission based on non-codebook, the maximum value of $N_{SRS}$ is 4; and the total number of SRS resources used in the uplink transmission based on codebook is at most 2, that is, in a case of the uplink transmission based on codebook, the maximum value of $N_{SRS}$ is 2. For a plurality of PUSCH transmissions, the base station may indicate a plurality of SRS resources to perform a plurality of PUSCH transmissions by transmitting the SRI information, that is, the SRI information is used for indicating a plurality of transmission beams to perform a plurality of PUSCH transmissions, thereby providing diversity gain of the beams.

In an embodiment, the SRI information is used for indicating K SRS resource groups, that is, the SRI information is used for indicating SRS resource indexes corresponding to SRS resources included in each of the K SRS resource groups. Each SRS resource group may include one or two SRS resources, and each SRS resource is indicated by one SRS resource index. For example, when the maximum value of $N_{SRS}$ is 4, the SRS resource index may be 0 to 3, that is, the SRS resources may be SRS0, SRS1, SRS2 or SRS3. For another example, the maximum value of $N_{SRS}$ is 2, the SRS resource index may be 0 to 1, that is, the SRS resources may be SRS0 or SRS1.

In an embodiment, that the spatial parameter information of the each of K uplink information element sets corresponds to the spatial parameter information of the respective one of the K SRS resource groups includes that spatial parameter information of an $i^{th}$ uplink information element set of the K uplink information element sets corresponds to spatial parameter information of an $i^{th}$ SRS resource group of the K SRS resource groups, where $i=1, \ldots, K$. In this embodiment, spatial parameter information of each SRS resource group is spatial parameter information corresponding to one uplink information element set. The each SRS resource group corresponds to a different uplink information element set, i.e. the spatial parameter information of each uplink information element set is indicated by a SRS resource group corresponding to the each uplink information element set. In an embodiment, one SRS resource group may include one SRS resource, or may also include two SRS resources, which is related to the maximum number of transport layers supported by the UE. Exemplarily, assuming that the maximum number of transport layers supported by the UE is 1, the number of SRS resources corresponding to one SRS resource group is 1; and for another example, assuming that the maximum number of transport layers supported by the UE is 2, the number of SRS resources corresponding to one SRS resource group can be 2.

In an embodiment, K uplink information element sets include at least one of a first uplink information element set or a second uplink information element set. The first uplink information element set includes one of a PUSCH transmission of which a PUSCH transmission indication value is less than or equal to a preset threshold, and a PUSCH transmission of which a PUSCH transmission indication value is an odd transmission indication value. The preset threshold value is half of a total number of PUSCH transmission indication values. The second uplink information element set includes one of a PUSCH transmission of which a PUSCH transmission indication value is greater than a preset threshold, and a PUSCH transmission of which a PUSCH transmission indication value is an even transmission indication value. The transmission indication value includes one of a number of transmissions and an index of the time unit, where each index of the time unit corresponds to one slot. In this embodiment, the UE performs each PUSCH transmission at different times. In an embodiment, a PUSCH transmission indication value may be a number of transmissions, or may also be an index of the time unit. Each index of the time unit corresponds to one time unit. For example, assuming that 8 PUSCH transmissions are performed with an interval of 1 slot, the index of the time unit may be 0 to 7 and the number of transmissions is 1 to 8, then a time unit corresponding to a second PUSCH transmission is a second slot, and so on, and a time unit corresponding to an eighth PSCH transmission is an eighth slot.

In an embodiment, assuming that K=2, the SRI information is used for indicating spatial parameter information of two uplink information element sets, which are spatial parameter information of the first uplink information element set and spatial parameter information of the second uplink information element set respectively, and the SRI information is used for indicating two SRS resource groups, that is, each SRS resource group corresponds to one uplink information element set. In an embodiment, the first uplink information element set and the second uplink information element set may be described in terms of the number of transmissions. Assuming that the SRI information indicates that M PUSCH transmissions are performed on two SRS resource groups, where the first uplink information element set may include: first M/2 PUSCH transmissions in the M transmissions, or an odd number of PUSCH transmissions in the M transmissions, and the second uplink information element set may include later M/2 PUSCH transmissions in the M transmissions, or an even number of PUSCH transmissions in the M transmissions. Exemplarily, assuming that M=8, the first uplink information element set includes: first 4 PUSCH transmissions in 8 transmissions, or an odd number of PUSCH transmissions in the 8 transmissions, that is, the first uplink information element set includes 1, 2, 3 and 4, or 1, 3, 5 and 7, and the second uplink information element set includes 5, 6, 7 and 8, or 2, 4, 6 and 8.

In an embodiment, the spatial parameter information includes at least one of transmission beam information, transmission beam group information, precoding matrix information, transport layer information, spatial relation information or spatial filter information. The transmission beam information refers to relevant information of a transmission beam adopted by the uplink information element set, that is, one uplink information element set adopts one transmission beam to perform the PUSCH transmission. The transmission beam group information refers to relevant information of a transmission beam group adopted by the uplink information element set, that is, one uplink information element set adopts at least two transmission beams to perform the PUSCH transmission. The precoding matrix information refers to matrix information including SRS resources with better transmission beam from the UE to the base station. The transport layer information refers to relevant information of each transport layer of the UE, for example, the transport layer information may include: the number of transport layers. The spatial relation information is used for characterizing the relevant information of the transmission beam. The spatial filter information is used for characterizing whether the transmission beams of two reference signals are identical, that is, if the spatial filter information of the two reference signals are identical, the relevant information of the transmission beams are identical.

In an embodiment, the SRI information includes one of an SRI index value and joint information of the SRI index value and a demodulation reference signal (DMRS) index value. In an embodiment, K SRS resource groups may be indicated to the UE through the SRI index value. In an embodiment, K SRS resource groups may be indicated to the UE through the SRI index value.

In an embodiment, that the SRI information is used for indicating the K SRS resource groups includes that: an SRI index value in an SRI bit domain of downlink control information (DCI) is used for indicating an SRS resource group corresponding to an $i^{th}$ uplink information element set, or an SRI index value of an $i^{th}$ SRS resource group in an SRI bit domain of DCI corresponds to an $i^{th}$ uplink information element set, where i=1, . . . , K.

In an embodiment, when that the SRI information is used for indicating K SRS resource groups includes the SRI index value in the SRI bit domain of the DCI for indicating the SRS resource group corresponding to the $i^{th}$ uplink information element set, that is, when the SRI index value is used for indicating K ($1 \leq K \leq N_{SRS}$) SRS resource groups, it is assumed that a scene is PUSCH transmission based on non-codebook, and the maximum number of transmission layers supported by the UE is 1, and K=2. $N_{SRS}$ is the maximum number of SRS resources configured by the UE. In this embodiment, the base station may indicate that M PUSCH transmissions are performed on two SRS resource groups to the UE through the SRI information, and each SRS resource corresponds to a different uplink information element set. Different uplink information element sets correspond to SRS resources in different SRS resource groups. In this embodiment, the spatial parameter information of the $i^{th}$ SRS resource group of the SRI information corresponds to the spatial parameter information corresponding to the $i^{th}$ uplink information element set, that is, the transmission beam of the $i^{th}$ uplink information element set is the transmission beam for transmitting the $i^{th}$ SRS resource group. The uplink information element set may adopt at least one of the following manners: the first uplink information element set includes first M/2 PUSCH transmissions in the M transmissions, or an odd number of PUSCH transmissions in the M transmissions; or correspondingly, the second uplink information element set may include later M/2 PUSCH transmissions in the M transmissions, or an even number of PUSCH transmissions in the M transmissions.

Table 1 is an SRI indication comparison table based on non-codebook PUSCH transmission according to an embodiment of the present application. As shown in FIG. 1, three cases that the SRI index values in Table 1 are 0 and 1, and $N_{SRS}$ is 2; the SRI index values are 0, 1 and 2 and $N_{SRS}$ is 3, and the SRI index values are 0, 1, 2 and 3 and $N_{SRS}$ is 4 are all SRI indication comparison tables based on non-codebook $L_{max}=1$ in R15. In this embodiment, the SRI domain is increased from the original 2 bits to 4 bits, and a newly added SRI index value is used for indicating different SRS resource groups corresponding to different uplink information element sets, where the SRS resource index refers to a serial number of a SRS resource adopted by the UE. The SRS resource index may be 0 to 3, that is, SRS0, SRS1, SRS2, and SRS3. In this embodiment, the UE may acquire SRS resources corresponding to different uplink information element sets through different SRI index values. For example, when M=8 and $N_{SRS}=4$, the SRI index value received by the UE is 6, then the first uplink information element set corresponds to the SRS0, and the second uplink information element set corresponds to the SRS3, that is, the first 4 PUSCH transmissions correspond to the SRS0, and the last 4 PUSCH transmissions correspond to the SRS3; or the first, third, fifth and seventh PUSCH transmissions correspond to the SRS0, and the second, fourth, sixth and eighth PUSCH transmissions correspond to the SRS3.

TABLE 1

| | an SRI indication comparison table based on non-codebook PUSCH transmission | | | | |
|---|---|---|---|---|---|
| SRI Index value | SRS resource index, $N_{SRS}=2$ | SRI Index value | SRS resource index, $N_{SRS}=3$ | SRI index value | SRS resource index, $N_{SRS}=4$ |
| 0 | 0 | 0 | 0 | 0 | 0 |
| 1 | 1 | 1 | 1 | 1 | 1 |
| 2 | 0; 1 | 2 | 2 | 2 | 2 |
| 3 | reserved | 3 | 0; 1 | 3 | 3 |
| | | 4 | 0; 2 | 4 | 0; 1 |
| | | 5 | 1; 2 | 5 | 0; 2 |
| | | 6-7 | reserved | 6 | 0; 3 |
| | | | | 7 | 1; 2 |
| | | | | 8 | 1; 3 |
| | | | | 9 | 2; 3 |
| | | | | 10-15 | reserved |

As shown in Table 1, when the SRI index value is 6 and $N_{SRS}=4$, the transmission beam of the first uplink information element set is a transmission beam for transmitting a first group of SRS resources, that is, the transmission beam of the first uplink information element set is a transmission beam for transmitting SRS0 resources; the transmission beam of the second uplink information element set is a transmission beam for transmitting the second group of SRS resources, that is, the transmission beam of the second uplink information element set is a transmission beam for transmitting SRS3 resources, thereby improving the diversity gain of the beams.

In an embodiment, that the SRI information is used for indicating K SRS resource groups includes that the SRI index value in the SRI bit domain of the DCI is used for indicating the $i^{th}$ uplink information element set corresponding to the $i^{th}$ SRS resource group. In this embodiment, the SRS bit domain pre-groups SRS resources. For example, assuming that there are eight SRS resources in total, the first four SRS resources consist of a first group and the last four SRS resources consist of a second group, the SRI bit domain is selected from two SRS resource groups, and the first SRS resource group corresponds to the first uplink information element set, and the second SRS resource group corresponds to the second uplink information element set.

In an embodiment, the SRS resource group satisfies at least one of the following characteristics: different uplink information element sets correspond to different SRS resource groups, or an SRS resource group is associated with one of the following information: spatial relation information and an SRS resource serial number. In this embodiment, the SRS resource is associated with the spatial relation information and/or the SRS resource serial number. For example, the corresponding spatial relation information may be obtained through the SRS resource group, and correspondingly, the corresponding SRS resource group may be obtained through the spatial relation information.

In an embodiment, when the SRI information includes the SRI index value, that is, the SRI index value is used for indicating K ($1 \leq K \leq N_{SRS}$) SRS resource groups, it is assumed that a scene is a PUSCH transmission based on non-codebook, and the maximum number of transmission layers supported by the UE is 1, and K=2. Table 2 is another SRI indication comparison table based on non-codebook PUSCH transmission according to an embodiment of the present application. As shown in FIG. 2, three cases that the SRI index values in Table 1 are 0 and 1, and $N_{SRS}$ is 2; the SRI index values are 0, 1 and 2 and $N_{SRS}$ is 3, and the SRI index values are 0, 1, 2 and 3 and $N_{SRS}$ is 4 are all SRI indication comparison tables based on non-codebook $L_{max}=1$ in R15. In this embodiment, the SRI domain is increased from 2 bits to 3 bits, the newly added row number (i.e. the SRI index value) is used for indicating that the SRS resources used by different uplink information element sets come from different SRS resource groups, where a grouping manner of SRS resource groups may adopt one of the following manners: grouping according to the spatial relation information region or grouping according to a serial number (i.e. distinguishing the first half of SRS resources from the second half of SRS resources) of the SRS resource. Exemplarily, the SRI index value indicator of the PUSCH transmission based on non-codebook of the present embodiment is described by taking the spatial relation information differentiation as an example. It is assumed that the UE is configured with four SRS resources and two pieces of spatial relation information at the same time, and each SRS resource is configured with one piece of spatial relation information, where SRS resources having the same spatial relation information are divided into one group. For another example, the SRI index value indicator of the PUSCH transmission based on non-codebook of the present embodiment is described by taking the distinction between the first half of SRS resources and the second half of SRS resources as an example. It is assumed that the UE is configured with four SRS resources, i.e., SRS0 resource, SRS1 resource, SRS2 resource and SRS3 resource, then the SRS0 resource and the SRS1 resource consist of one group, and the SRS2 resource and the SRS3 resource consist of one group. The uplink information element set may adopt at least one of the following manners: the first uplink information element set includes first M/2 transmissions in the M transmissions, or an odd number of PUSCH transmissions in the M transmissions; or correspondingly, the second uplink information element set may include later M/2 transmissions in the M transmissions, or an even number of PUSCH transmissions in the M transmissions.

Exemplarily, when the SRS resource group is grouped in the way of the first half and the second half of SRS resources, the SRI index value indicates the way as shown in Table 2. For example, when M=8 and $N_{SRS}=4$, the SRI index value received by the UE is 6, then the first uplink information element set corresponds to the SRS1, and the second uplink information element set corresponds to the SRS2, that is, the first 4 PUSCH transmissions correspond to the SRS1, and the last 4 PUSCH transmissions correspond to the SRS2; or the first, third, fifth and seventh PUSCH transmissions correspond to the SRS1, and the second, fourth, sixth and eighth PUSCH transmissions correspond to the SRS2.

TABLE 2

| | another SRI indication comparison table based on non-codebook PUSCH transmission | | | | |
|---|---|---|---|---|---|
| SRI index | SRS resource index, $N_{SRS}=2$ | SRI index value | SRS resource index, $N_{SRS}=3$ | SRI index value | SRS resource index, $N_{SRS}=4$ |
| 0 | 0 | 0 | 0 | 0 | 0 |
| 1 | 1 | 1 | 1 | 1 | 1 |
| 2 | 0; 1 | 2 | 2 | 2 | 2 |
| 3 | reserved | 3 | 0; 1 | 3 | 3 |
| | | 4 | 0; 2 | 4 | 0; 2 |
| | | 5-7 | reserved | 5 | 0; 3 |
| | | | | 6 | 1; 2 |
| | | | | 7 | 1; 3 |

As shown in Table 2, when the SRI index value is 6 and $N_{SRS}=4$, the transmission beam of the first uplink information element set is a transmission beam for transmitting a first group of SRS resources, that is, the transmission beam of the first uplink information element set is a transmission beam for transmitting SRS1 resources; the transmission beam of the second uplink information element set is a transmission beam for transmitting the second group of SRS resources, that is, the transmission beam of the second uplink information element set is a transmission beam for transmitting SRS2 resources, and the SRS resource (SRS2) adopted by the second uplink information element set and the SRS resource (SRS1) adopted by the first uplink information element set belong to different SRS resource groups thereby improving the diversity gain of the beams.

In an embodiment, the SRI information is used for indicating K SRS resource groups, and the spatial parameter information of each of the uplink information element sets corresponds to the spatial parameter information of a respective one of the K SRS resource group. The SRI index value is used for indicating the SRS resource corresponding to the first uplink information element set. The SRS resource group corresponding to the second uplink information element set is acquired according to one of the following information: an SRS resource with the largest index identifier (ID) except the SRS resource corresponding to the first uplink information element set indicated by the SRI index value, and an SRS resource with the smallest index ID except the SRS resource corresponding to the first uplink information element set indicated by the SRI index value, where the first uplink information element set and the second uplink information element set belong to K uplink information element sets, and K is an integer greater than or equal to 1.

In an embodiment, when the SRI information includes the SRI index value, that is, the SRI index value is used for indicating K ($1 \leq K \leq N_{SRS}$) SRS resource groups, it is assumed that a scene is a PUSCH transmission based on non-codebook, the maximum number of transmission layers supported by the UE is 1, and K=2. The SRI index value is used for indicating the SRS resource corresponding to the first uplink information element set, and an indication manner of the SRI index value includes that the SRI index value is an index ID of the indicated SRS resource. Exemplarily, the SRI index value is 2, it is represented that the SRS resource group corresponding to the first uplink information element set is the SRS2. In this embodiment, the SRS resource group corresponding to the second uplink information element set is acquired according to one of the following manners: an SRS resource with the largest index ID except the SRS resource corresponding to the first uplink information element set indicated by the SRI index value, and an SRS resource with the smallest index ID except the SRS resource corresponding to the first uplink information element set indicated by the SRI index value. The uplink information element set may adopt at least one of the following manners: the first uplink information element set includes first M/2 transmissions in the M transmissions, or an odd number of PUSCH transmissions in the M transmissions; or correspondingly, the second uplink information element set may include later M/2 transmissions in the M transmissions, or an even number of PUSCH transmissions in the M transmissions.

Table 3 is a comparison table of an SRS resource with the largest ID corresponding to a PUSCH transmission based on non-codebook according to an embodiment of the present application. The SRS resource with the largest index ID except the SRS resource corresponding to the first uplink information element set indicated by the SRI index value may be adopted, and the SRS resource corresponding to the obtained second uplink information element set (i.e. the later M/2 transmissions in the M transmissions or an even number of PUSCH transmissions in the M transmissions) is shown in Table 3. In an embodiment, a manner adopted by the SRS resource corresponding to the second uplink information element set is the SRS resource with the largest index ID except the SRS resource corresponding to the first uplink information element set indicated by the SRI index value. When M=8, $N_{SRS}=4$ and SRI=2 (that is, the SRI index value is 2), then the first uplink information element set corresponds to the SRS2, and the second uplink information element set corresponds to the SRS3, that is, the first 4 PUSCH transmissions correspond to the SRS2, and the last 4 PUSCH transmissions correspond to the SRS3; or the first, third, fifth and seventh PUSCH transmissions correspond to the SRS2, and the second, fourth, sixth and eighth PUSCH transmissions correspond to the SRS3.

TABLE 3

| a comparison table of an SRS resource with the largest ID corresponding to a PUSCH transmission based on non-codebook | | | | | |
|---|---|---|---|---|---|
| SRI index value | SRS resource index, $N_{SRS}=2$ | SRI index value | SRS resource index, $N_{SRS}=3$ | SRI index value | SRS resource index, $N_{SRS}=4$ |
| 0 | 0; 1 | 0 | 0; 2 | 0 | 0; 3 |
| | | 1 | 1; 2 | 1 | 1; 3 |
| | | 2 | 2; 1 | 2 | 2; 3 |
| | | | | 3 | 3; 2 |

As shown in FIG. 3, when the SRI index value is 2, the SRS resource corresponding to the first uplink information element set is the SRS2, and $N_{SRS}=4$, that is, the number of SRS resources configured by the UE is 4, which are SRS0~SRS3. When the SRS resource corresponding to the first uplink information element set is the SRS2, the SRS resource corresponding to the second uplink information element set is the SRS resource with the largest index ID except the SRS resource (i.e. SRS2) corresponding to the first uplink information element set indicated by the SRI index value, that is, the SRS resource corresponding to the second uplink information element set is the SRS3.

Table 4 is a comparison table of an SRS resource with the smallest ID corresponding to a PUSCH transmission based on non-codebook according to an embodiment of the present application. The SRS resource with the smallest index ID except the SRS resource corresponding to the first uplink information element set indicated by the SRI index value is adopted, and the SRS resource corresponding to the obtained second uplink information element set (i.e. the later M/2 transmissions in the M transmissions or an even number of PUSCH transmissions in the M transmissions) is shown in Table 4. In an embodiment, a manner adopted by the SRS resource corresponding to the second uplink information element set is the SRS resource with the smallest index ID except the SRS resource corresponding to the first uplink information element set indicated by the SRI index value. When M=8, $N_{SRS}=4$ and SRI=2 (i.e., the SRI index value), then the first uplink information element set corresponds to the SRS2 resource, and the second uplink information element set corresponds to the SRS0, that is, the first 4 PUSCH transmissions correspond to the SRS2 resource, and the last 4 PUSCH transmissions correspond to the SRS0; or the first, third, fifth and seventh PUSCH transmissions correspond to the SRS2 resource, and the second, fourth, sixth and eighth PUSCH transmissions correspond to the SRS0 resource.

TABLE 4 a comparison table of an SRS resource with the smallest ID corresponding to a PUSCH transmission based on non-codebook

| SRI index value | SRS resource index, $N_{SRS} = 2$ | SRI index value | SRS resource index, $N_{SRS} = 3$ | SRI index value | SRS resource index, $N_{SRS} = 4$ |
|---|---|---|---|---|---|
| 0 | 0; 1 | 0 | 0; 1 | 0 | 0; 1 |
|   |      | 1 | 1; 0 | 1 | 1; 0 |
|   |      | 2 | 2; 0 | 2 | 2; 0 |
|   |      |   |      | 3 | 3; 0 |

As shown in Table 4, when the SRI index value is 2, the SRS resource corresponding to the first uplink information element set is the SRS2, and $N_{SRS}=4$, that is, the number of SRS resources configured by the UE is 4, which are SRS0 to SRS3. When the SRS resource corresponding to the first uplink information element set is the SRS2, the SRS resource group corresponding to the second uplink information element set is acquired by the SRS resource with the smallest index ID except the SRS resource (i.e. SRS2) corresponding to the first uplink information element set indicated by the SRI index value, that is, the SRS resource corresponding to the second uplink information element set is the SRS0.

In an embodiment, the SRI information is used for indicating K SRS resource groups, and that the spatial parameter information of each of the uplink information element sets corresponds to the spatial parameter information of a respective one of the K SRS resource group: the SRI index value indicates the SRS resource corresponding to the first uplink information element set, and a DMRS index value indicates the SRS resource corresponding to the second uplink information element set, where the first uplink information element set and the second uplink information element set belong to K uplink information element sets.

In an embodiment, the SRS resource group may comprise a plurality of SRS resource or one SRS resource. When the SRS resource group comprises one SRS resource, adopting the DMRS index value to indicate the SRS resource corresponding to the second uplink information element set includes the followings: the DMRS index value is used for indicating an offset of an index ID of the SRS resource corresponding to the second uplink information element set relative to an index ID of the SRS resource indicated by the SRI index value; or the DMRS index value is an index ID of the SRS resource corresponding to the second uplink information element set.

In an embodiment, when the SRI information includes joint information of the SRI index value and the DMRS index value, that is, the joint information of the SRI index value and the DMRS index value is adopted to indicate K SRS resource groups ($1 \leq K \leq N_{SRS}$), and the DMRS index value is used for indicating the offset of the index ID of the SRS resource corresponding to the second uplink information element set relative to the index ID of the SRS resource indicated by the SRI index value, it is assumed that the scene is PUSCH transmission based on non-codebook, the maximum number of transmission layers supported by the UE is 1, and K=2. In this embodiment, the SRI index value is adopted to indicate the SRS resource corresponding to the first uplink information element set, and the DMRS index value is adopted to indicate the SRS resource corresponding to the second uplink information element set. The indication manner of the SRI index value is indicating according to an indication manner of Release 15 (R15), that is, the SRI index value is the index ID of the SRS resource corresponding to the first uplink information element set. An indication manner of the DMRS index value is as follows: the DMRS index value is used for indicating the offset of the index ID of the SRS resource corresponding to the second uplink information element set relative to the index ID of the SRS resource indicated by the SRI index value. For example, the SRI index value indicates that the SRS resource corresponding to the first uplink information element set is SRS0, and the DMRS index value in downlink control information (DCI) is 2, that is, the offset of the index ID of the SRS resource relative to the SRS0 is 2, then the SRS resource corresponding to the second uplink information element set is SRS2. The uplink information element set may adopt at least one of the following manners: the first uplink information element set includes first M/2 transmissions in the M transmissions, or an odd number of PUSCH transmissions in the M transmissions; or correspondingly, the second uplink information element set may include later M/2 transmissions in the M transmissions, or an even number of PUSCH transmissions in the M transmissions.

Exemplarily, Table 5 is a comparison table for indicating the SRS resource by the joint information of the SRI index value and the DMRS index value according to an embodiment of the present application. Assuming that M=8, $N_{SRS}=4$, SRI=2 (the SRI index value is 2) and the DMRS index value is 2, the first uplink information element set corresponds to the SRS2 resource, and the second uplink information element set corresponds to the SRS0 resource, that is, the first 4 PUSCH transmissions correspond to the SRS2 resource, and the last 4 PUSCH transmissions correspond to the SRS0 resource; or the first, third, fifth and seventh PUSCH transmissions correspond to the SRS2 resource, and the second, fourth, sixth and eighth PUSCH transmissions correspond to the SRS0 resource.

TABLE 5 is a comparison table for indicating an SRS resource by joint information of an SRI index value and a DMRS index value

| $N_{SRS} = 2$ | | $N_{SRS} = 3$ | | | $N_{SRS} = 4$ | | | |
|---|---|---|---|---|---|---|---|---|
| SRI | DMRS = 1 | SRI | DMRS = 1 | DMRS = 2 | SRI | DMRS = 1 | DMRS = 2 | DMRS = 3 |
| 0 | 1 | 0 | 1 | 2 | 0 | 1 | 2 | 3 |
|   |   | 1 | 2 | 0 | 1 | 2 | 3 | 0 |
|   |   | 2 | 0 | 1 | 2 | 3 | 0 | 1 |
|   |   |   |   |   | 3 | 0 | 1 | 2 |

As shown in Table 5, the DMRS index value indicates the offset of the index ID of the SRS resource relative to the index ID of the SRS resource indicated by the SRI index value. For example, when $N_{SRS}$=4, SRI=3, DMRS=3, the SRS resource corresponding to the first uplink information element set is SRS3, and the SRS resource corresponding to the second uplink information element set is SRS2.

In an embodiment, when the SRI information includes joint information of the SRI index value and the DMRS index value, that is, the joint information of the SRI index value and the DMRS index value is adopted to indicate K SRS resource groups ($1 \leq K \leq N_{SRS}$), and adopting the DMRS index value to indicate the SRS resource corresponding to the second uplink information element set includes the DMRS index value being an index ID of the SRS resource corresponding to the second uplink information element set. In this embodiment, it is assumed that the scene is M PUSCH transmissions based on non-codebook, the maximum number of transmission layers supported by the UE is 1, and K=2. In this embodiment, the SRI index value is adopted to indicate the SRS resource corresponding to the first uplink information element set, and the DMRS index value is adopted to indicate the SRS resource corresponding to the second uplink information element set. The indication manner adopting the SRI index value is indicating according to the indication manner of R15, that is, the SRI index value is the index ID of the SRS resource corresponding to the first uplink information element set. The indication manner adopting the DMRS index value is as follows: the DMRS index value is the index ID of the SRS resource corresponding to the second uplink information element set. For example, the SRI index value indicates that the SRS resource corresponding to the first uplink information element set is SRS0, and when the DMRS index value in the DCI is 2, the SRS resource corresponding to the second uplink information element set is SRS2. The uplink information element set may adopt at least one of the following manners: the first uplink information element set includes first M/2 transmissions in the M transmissions, or an odd number of PUSCH transmissions in the M transmissions; or correspondingly, the second uplink information element set includes later M/2 transmissions in the M transmissions, or an even number of PUSCH transmissions in the M transmissions. That is, the first 4 PUSCH transmissions correspond to the SRS0 resource, and the last 4 PUSCH transmissions correspond to the SRS2 resource; or, the first, third, fifth and seventh PUSCH transmissions correspond to the SRS0 resource, and the second, fourth, sixth and eighth PUSCH transmissions correspond to the SRS2 resource.

In an embodiment, when the SRI information includes joint information of the SRI index value and the DMRS index value, that is, the joint information of the SRI index value and the DMRS index value is adopted to indicate K SRS resource groups ($1 \leq K \leq N_{SRS}$), and adopting the DMRS index value to indicate the SRS resource corresponding to the second uplink information element set includes adopting the DMRS index value to indicate the offset of the index ID of the SRS resource corresponding to the second uplink information element set relative to the index ID of the SRS resource indicated by the SRI index value. It is assumed that the scene is PUSCH transmissions based on non-codebook, the maximum number of transmission layers supported by the UE is 2, and K=2, that is, the number of SRS resources corresponding to each uplink information element set is 2. In this embodiment, the SRI index value is adopted to indicate two SRS resources corresponding to the first uplink information element set, and the DMRS index value is adopted to indicate two SRS resources corresponding to the second uplink information element set. The indication manner of the SRI index value is indicating according to the indication manner of $L_{max}$=2 of R15, that is, the SRI index value is the index ID of the SRS resources corresponding to the first uplink information element set. The indication manner adopting the DMRS index value is as follows: the DMRS index value is the index ID of the SRS resources corresponding to the second uplink information element set. For example, the SRI index value indicates that the SRS resources corresponding to the first uplink information element set are SRS0 and SRS3, and the DMRS index value in the DCI is 2, that is, the offset of the index ID of the SRS resource relative to the SRS0 and SRS3 is 2, then the SRS resources corresponding to the second uplink information element set is SRS2 and SRS1. The uplink information element set may adopt at least one of the following manners: the first uplink information element set includes first M/2 transmissions in the M transmissions, or an odd number of PUSCH transmissions in the M transmissions; or correspondingly, the second uplink information element set includes later M/2 transmissions in the M transmissions, or an even number of PUSCH transmissions in the M transmissions. That is, the first 4 PUSCH transmissions correspond to the SRS0 and SRS3, and the last 4 PUSCH transmissions correspond to the SRS2 and SRS1; or, the first, third, fifth and seventh PUSCH transmissions correspond to the SRS0 and SRS3, and the second, fourth, sixth and eighth PUSCH transmissions correspond to the SRS2 and SRS1.

In an embodiment, when the SRI information includes joint information of the SRI index value and the DMRS index value, that is, the joint information of the SRI index value and the DMRS index value is adopted to indicate K SRS resource groups ($1 \leq K \leq N_{SRS}$), and adopting the DMRS index value to indicate the SRS resource corresponding to the second uplink information element set includes the DMRS index value being an index ID of the SRS resource corresponding to the second uplink information element set. It is assumed that the scene is PUSCH transmissions based on non-codebook, the maximum number of transmission layers supported by the UE is 2, and K=2. The base station may indicate that M PUSCH transmissions are performed on K ($1 \leq K \leq N_{SRS}$) SRS resources to the UE through the SRI index value, each PUSCH transmission corresponding to two SRS resources, and different uplink information element sets correspond to different SRS resource groups. $N_{SRS}$ is the maximum number of SRS resources configured by the UE. The uplink information element set may adopt at least one of the following manners: the first uplink information element set includes first M/2 PUSCH transmissions in the M transmissions, or an odd number of PUSCH transmissions in the M transmissions; or correspondingly, the second uplink information element set includes later M/2 PUSCH transmissions in the M transmissions, or an even number of PUSCH transmissions in the M transmissions. In this embodiment, an i$^{th}$ SRS resource group of the SRI information is used for indicating the spatial parameter information of the i$^{th}$ uplink information element set, that is, a transmission beam of the i$^{th}$ uplink information element set used for transmitting a transmission beam of the i$^{th}$ SRS resource group.

Table 6 is an SRI indication comparison table based on non-codebook PUSCH transmission according to an embodiment of the present application. As shown in Table 6, a reserved row in an SRI indication table of $L_{max}$=2 based on non-codebook in R15 is added, a newly added SRI index value indicates that different uplink information element sets correspond to different SRS resources, and the UE acquires the SRS resources corresponding to different uplink information element sets through different SRI index values. For example, when M=8 and $N_{SRS}$=4, the SRI index value received by the UE is 10, then the first uplink information element set corresponds to SRS0 and SRS1, and the second uplink information element set corresponds to SRS2 and SRS3, that is, the first 4 PUSCH transmissions correspond to SRS0 and SRS1, and the last 4 PUSCH transmissions correspond to SRS2 and SRS3; or the first, third, fifth and seventh PUSCH transmissions correspond to SRS0 and SRS1, and the second, fourth, sixth and eighth PUSCH transmissions correspond to SRS2 and SRS3.

TABLE 6 an SRI indication comparison table based on non-codebook PUSCH transmission

| SRI index value | SRS resource index, $N_{SRS}$ = 2 | SRI index value | SRS resource index, $N_{SRS}$ = 3 | SRI index value | SRS resource index, $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
|  |  | 4 | 0, 2 | 4 | 0, 1 |
|  |  | 5 | 1, 2 | 5 | 0, 2 |
|  |  | 6-7 | reserved | 6 | 0, 3 |
|  |  |  |  | 7 | 1, 2 |
|  |  |  |  | 8 | 1, 3 |
|  |  |  |  | 9 | 2, 3 |
|  |  |  |  | 10 | 0, 1; 2, 3 |
|  |  |  |  | 11 | 0, 2; 1, 3 |
|  |  |  |  | 12 | 0, 3; 1, 2 |
|  |  |  |  | 13-15 | reserved |

As shown in Table 6, when $N_{SRS}$=4 and the SRI index value is 10, a transmission beam of the first uplink information element set is a transmission beam for transmitting a first group of SRS resources, that is, the transmission beam of the first uplink information element set is a transmission beam for transmitting SRS0 and SRS1; a transmission beam of the second uplink information element set is a transmission beam for transmitting a second group of SRS resources, that is, the transmission beam of the second uplink information element set is a transmission beam for transmitting SRS2 and SRS3, thereby improving the diversity gain of the beams.

In an embodiment, that the SRI information is used for indicating K SRS resource groups includes that an SRI bit domain is extended, and an $i^{th}$ group of SRI index values in the SRI bit domain is used for indicating an SRS resource group corresponding to an $i^{th}$ uplink information element set. It is assumed that a scene is PUSCH transmissions based on codebook, the base station indicates that M PUSCH transmissions are performed on K (1≤K≤2) SRS resource groups to the UE through the SRI index value, and K=2. The SRS resources corresponds to different uplink information element set, and the uplink information element set may adopt at least one of the following manners: the first uplink information element set includes first M/2 PUSCH transmissions in the M transmissions, or an odd number of PUSCH transmissions in the M transmissions; or correspondingly, the second uplink information element set includes later M/2 PUSCH transmissions in the M transmissions, or an even number of PUSCH transmissions in the M transmissions.

Table 7 is an SRI indication comparison table based on codebook PUSCH transmission according to an embodiment of the present application. As shown in Table 7, the SRI domain is increased from the original 1 bit to 2 bits, a number of newly added rows (i.e. the SRI index value) indicates that different uplink information element sets correspond to different SRS resource groups, and the UE acquires the SRS resource groups corresponding to different uplink information element sets through different SRI index values. For example, when M=8 and $N_{SRS}$=2, the SRI index value received by the UE is 2, then the first uplink information element set corresponds to SRS0, and the second uplink information element set corresponds to SRS1, that is, the first 4 PUSCH transmissions correspond to SRS0, and the last 4 PUSCH transmissions correspond to SRS1; or the first, third, fifth and seventh PUSCH transmissions correspond to SRS0, and the second, fourth, sixth and eighth PUSCH transmissions correspond to SRS1.

TABLE 7 an SRI indication comparison table based on codebook PUSCH transmission

| SRI index value | SRS resource index, $N_{SRS}$ = 2 |
|---|---|
| 0 | 0 |
| 1 | 1 |
| 2 | 0; 1 |
| 3 | reserved |

As shown in Table 7, for a PUSCH transmission based on codebook, the maximum of $N_{SRS}$ is 2. When the SRI index value is 2 and $N_{SRS}$=4, a transmission beam of the first uplink information element set is a transmission beam for transmitting a first SRS resource group, that is, the transmission beam of the first uplink information element set is a transmission beam for transmitting SRS0 resources; a transmission beam of the second uplink information element set is a transmission beam for transmitting SRS resources included in a second group, that is, the transmission beam of the second uplink information element set is a transmission beam for transmitting SRS1, thereby improving the diversity gain of the beams.

In an embodiment, the SRI information includes joint information of the SRI index value and the DMRS index value, that is, the joint information of the SRI index value and the DMRS index value indicates the SRS resource corresponding to the uplink information element set. It is assumed that a scene is PUSCH transmission based on codebook and a single-User Multiple-Input Multiple-Output (SU-MIMO). The UE is configured with at most two SRS resources, i.e. SRS0 and SRS1, respectively. A corresponding manner of SRS resources and PUSCH transmission is jointly indicated by the SRI index value and the DMRS index value. Exemplarily, the DMRS index value is 0, which means that M PUSCH transmissions all correspond to a same SRS resource, that is, the SRS resource corresponding to each PUSCH transmission is indicated by the SRI index value. The DMRS index value is 1, which means that the first uplink information element set corresponds to SRS0 and the second uplink information element set corresponds to SRS1. The DMRS index value is 2, which means that the first uplink information element set corresponds to SRS1 and the second uplink information element set corresponds to SRS0. The uplink information element set may adopt at least one of the following manners: the first uplink information element set includes first M/2 PUSCH transmissions in the M transmissions, or an odd number of PUSCH transmissions in the M transmissions; or correspondingly, the second uplink information element set includes later M/2 PUSCH transmissions in the M transmissions, or an even number of PUSCH transmissions in the M transmissions.

In a mobile high-speed railway network, a reception optimal beam and a transmission optimal beam between the base station and the UE are often switched and updated. A railway is fixed, that is, a traveling track of the UE is fixed. Assuming that the UE follows a speed of the high-speed railway and advances at a constant speed, the UE is in different positions at different times, and the positions are known or determined for the base station. Thus, the UE may be indicated by the base station to a different optimal reception beam of a downlink channel or a downlink signal, or an optimal transmission beam of an uplink channel or a signal, i.e. to update the TCI status of the downlink channel or the TCI status of the downlink signal, or to update a spatial relation information of the uplink channel or a spatial relation information of the uplink signal. FIG. 2 is a schematic diagram of a beam handover of a UE in a high-speed rail scene according to an embodiment of the present application. As shown in FIG. 2, optionally, a transmission beam and a reception beam corresponding to UE0 and UE1 in the high-speed rail at T0 moment may be beam 0, beam 1 or beam 2. The transmission beam and reception beam corresponding to UE0 and UE1 in high-speed rail at T1 moment may be beam 4, beam 5 or beam 6. In one embodiment, the above may be implemented by adopting the following manner.

FIG. 3 is a flowchart of another indication method according to an embodiment of the present application. This embodiment may be implemented by a base station.

As shown in FIG. 3, the method in this embodiment includes S220.

In S220, a spatial parameter information set is configured.

The spatial parameter information set is used for updating at least one of a spatial parameter of a physical channel or a spatial parameter of a physical signal at different transmission times, and the spatial parameter information set includes a transmission configuration indicator (TCI) state set or a spatial relation information set.

In this embodiment, the base station configures the TCI state set or the spatial relation set, and transmits the TCI state set and the spatial relation set to the UE, so that the UE updates at least one of the spatial parameter of the physical channel or the spatial parameter of the physical signal at different transmission times according to the TCI state set or the spatial relation set.

In an embodiment, at least one of the spatial parameter of the physical channel or the spatial parameter of the physical signal is determined according to at least one of: a time unit index where the physical channel and/or the physical signal is located, or a mapping relationship between a spatial parameter and a time unit, where the spatial parameter includes one of: quasi-co-address reference signal information, spatial relation information or spatial filter information. The quasi-co-address reference signal information may be configured in the TCI state.

In an embodiment, that the spatial parameter information set is used for updating at least one of the spatial parameter of the physical channel or the spatial parameter of the physical signal at the different transmission times includes that the spatial parameter information set is used for triggering the UE to sequentially update the spatial parameter of the physical channel and/or sequentially update the spatial parameter of the physical signal according to an initial position and the mapping relationship between the spatial parameter and the time unit. In this embodiment, after the spatial parameter information set is received, the UE determines an $(n+1)^{th}$ spatial parameter in a corresponding spatial parameter information set according to a pre-configured starting position n, and sequentially updates the spatial parameter of the physical channel and/or sequentially updates the spatial parameter of the physical signal according to the mapping relationship between the spatial parameter and the time unit.

In an embodiment, the physical channel includes at least one of a physical downlink shared channel (PDSCH), a PUSCH, a physical downlink control channel (PDCCH) or a physical uplink control channel (PUCCH); and/or the physical signal includes at least one of an SRS or a channel state information reference signal (CSI-RS).

In an embodiment, a time unit is configured by first high layer signaling, and the time unit is used for determining an update interval of a spatial parameter in the spatial parameter information set, where the time unit includes a fixed time unit or a time unit set. In this embodiment, the first high layer signaling may be radio resource control (RRC) signaling or medium access control (MAC)-control element (CE) signaling. In this embodiment, the UE is configured with a TCI state set or a spatial relation information set by the RRC signaling, and the time unit is configured by the MAC-CE signaling.

In an embodiment, one initial position is configured by second high layer signaling, and the initial position is used for determining an update initial position of a spatial parameter in the spatial parameter information set. In this embodiment, the second higher layer signaling may be an activation instruction, and the activation instruction may be the MAC-CT signaling. One initial position is configured by the MAC-CE signaling to enable the UE to be activated or indicate the one initial position.

In an embodiment, the base station configures a TCI state set and a time unit through the first high layer signaling, and configures an initial position through the second high layer signaling. The time unit is an update time interval, the time unit set is an update time interval set. The first high layer signaling is the RRC signaling or the MAC-CE signaling, and the second high layer signaling is the MAC-CE signaling. In this embodiment, a TCI state set is configured for the UE through the first high layer signaling (the RRC signaling), and the TCI state set includes N (N≥1) TCI states. The TCI state refers to a TCI state which is configured for the UE by the base station and is used for receiving a target downlink signal or a target downlink channel, and the TCI state is associated with at least the following configuration information: a first source reference signal. The first source reference signal refers to a source reference signal of a first quasi co-location (QCL) type (e.g. QCL-Type D) corresponding to the target downlink signal or the target downlink channel. A fixed update time interval T or an update time interval set T* is configured for the UE through the first high layer signaling (e.g. the MAC-CE signaling), and the update time interval set T* includes N−1 different update time intervals. The update time interval refers to a time interval between a current TCI state and a next TCI state updated by the UE. The UE is activated or indicates an initial position n (0≤n≤N−1) through the second higher layer signaling (e.g. the MAC-CE signaling), wherein the initial position n corresponds to a $(n+1)^{th}$ TCI state in the TCI state set, and is used for indicating the UE to sequentially update a TCI state of the downlink signal and/or sequentially update a TCI state of the downlink channel (including but not limited to the PDCCH, the PDSCH and the CSI-RS) from the $(n+1)^{th}$ TCI state in the TCI state set. The time interval among each updating TCI states is obtained according to the configured fixed update time interval T or according to an update time interval value and order in the configured update time interval set T*.

Exemplarily, the base station configures a TCI state set A=[TCI0, TCI1, TCI2] including three TCI states through the RRC signaling, and then configures an update interval set T*=[1, 2] through the MAC-CE signaling, where the unit is a slot. An initial position activated by the UE through the MAC-CE signaling is n=0. After receiving the above information, the UE updates the current received TCI state to a first TCI state in the TCI state set, i.e. TCI0, according to an order of TCI states in the TCI state set A, the UE automatically updates the current received PDSCH TCI state to TCI1 after one slot, and the UE automatically updates the current received PDSCH TCI state to TCI2 after two slots. That is to say, as the UE receives the TCI state set rather than a single TCI state, the UE does not need to receive another TCI state when the current TCI state is updated, the UE is able to automatically update the TCI state of the UE.

In an embodiment, the base station configures a spatial relation information set and a time unit through the first high layer signaling, and configures an initial position through the second high layer signaling. The time unit is an update time interval, the time unit set is an update time interval set. The first high layer signaling is the RRC signaling or the MAC-CE signaling, and the second high layer signaling is the MAC-CE signaling. In this embodiment, the spatial relation information set is configured for the UE through the first high layer signaling (e.g. RRC signaling), the spatial relation information set includes N (N≥1) pieces of spatial relation information, and the spatial relation information included in each spatial relation information set is not completely identical. The spatial relation information includes an uplink reference signal or a downlink reference signal for indicating an uplink channel or an uplink signal, respectively having a same spatial filter as the uplink reference signal, or for indicating an uplink channel or an uplink signal, respectively having a same spatial filter as the downlink reference signal. For example, a DM-RS of the PUSCH is configured with one piece of spatial relation information including an SRS for indicating that the PUSCH DM-RS and the SRS resource have the same spatial filter. A fixed update time interval T or an update time interval set T* is configured for the UE through the second high layer signaling (e.g. the MAC-CE signaling), and the update time interval set T* includes N−1 different update time intervals. An update time interval refers to a time interval between current spatial relation information and next spatial relation information updated by the UE. The UE is activated or indicates an initial position n (0≤n≤N−1) through the second higher layer signaling (e.g. the MAC-CE signaling), where the initial position n corresponds to $(n+1)^{th}$ spatial relation information in the spatial relation information set, and is used for indicating the UE to sequentially update spatial relation information of the uplink signal and/or sequentially update spatial relation information of the uplink channel (including but not limited to the PUCCH, the PUSCH and the SRS) from the $(n+1)^{th}$ spatial relation information in the spatial relation information set. The time interval among each updating spatial relations is obtained according to the configured fixed update time interval T or according to an update time interval value and order in the configured update time interval set T*.

Exemplarily, the base station configures a spatial relation information set A=[SpecialrelationInfo0, Specialrelation-Info1, SpecialrelationInfo2] including three pieces of spatial relation information through the RRC signaling, and then configures an update interval set T*=[1, 2] through the MAC-CE signaling, where the unit is a slot. An initial position activated by the UE through the MAC-CE signaling is n=0. After the above information is received, the UE updates the current transmitted spatial relation information to first spatial relation information in the spatial relation information set, i.e. SpecialrelationInfo0, according to an order of spatial relation information in the spatial relation information set A, the UE automatically updates the current transmitted PUCCH spatial relation information to Special-relationInfo1 after one slot, and the UE automatically updates the current transmitted PUCCH spatial relation information to SpecialrelationInfo2 after two slots.

In an embodiment, a time unit and at least two spatial parameter information sets are configured by third high layer signaling, and the time unit includes a fixed time unit or a time unit set. The third higher layer signaling may be the RRC signaling, or the MAC-CE signaling. In an embodiment, at least two spatial parameter information sets are configured by the RRC signaling, and time unit is configured by the MAC-CE signaling.

In an embodiment, one spatial parameter set of at least two spatial parameter sets is selected by fourth high layer signaling, and a spatial parameter which is in the selected spatial parameter set and corresponds to each transmission time is determined according to the time unit and the initial position. The fourth higher layer signaling may be the MAC-CE signaling. In this embodiment, a time unit and an initial position are configured by the MAC-CE signaling, and one spatial parameter information set is selected from at least two spatial parameter sets through the MAC-CE signaling, and a spatial parameter which is in the selected spatial parameter information set and corresponds to each transmission time is determined according to the time unit and the initial position. The spatial parameter set includes a TCI state set or a spatial relation information set, that is, when the spatial parameter set is the TCI state set, the spatial parameter is in a TCI state, and when the spatial parameter set is the spatial relation information set, the spatial parameter is the spatial relation information.

In this embodiment, the time unit and at least two TCI state sets are configured through third high layer signaling, and one TCI state set of at least two TCI state sets is selected through the fourth high layer signaling, and a TCI state which is in the selected TCI state set and corresponds to each transmission time is determined according to the time unit and the initial position. In this embodiment, the time unit is an update time interval, and the time unit set is an update time interval set. M TCI state sets are configured for the UE through the third high layer signaling (e.g., the RRC signaling), each TCI state set includes N (N≥1) TCI states, and N TCI states in each TCI state set are not completely identical. The TCI state refers to a TCI state configured by the base station to receive a target downlink signal or a target downlink channel for the UE, and the TCI state is associated with at least the following configuration information: a first source reference signal. The first source reference signal refers to a source reference signal of a first QCL type (e.g. QCL-Type D) corresponding to the target downlink signal or the target downlink channel. A fixed update time interval T or an update time interval set T* is configured for the UE through the first high layer signaling (e.g. the MAC-CE signaling), and the update time interval set T* includes N−1 different update time intervals. The update time interval refers to a time interval between a current TCI state and a next TCI state updated by the UE. The UE is activated or indicates a TCI state set n (0≤n≤N−1) in M TCI state sets through the fourth higher layer signaling (e.g. the MAC-CE signaling). The UE sequentially updates the TCI states of the downlink signal and/or sequentially updates the TCI states of the downlink channel (including but not limited to PDCCH. PDSCH, CSI-RS) from a first TCI state in the indicated specified TCI state set. The time interval among updating each TCI state is obtained according to the configured fixed update time interval T or according to an update time interval value and order in the configured update time interval set T*.

Exemplarily, the base station configures two TCI state set A1, A2 through the MAC-CE signaling, each TCI state set includes three TCI states, i.e. A1=[TCI0,TCI1,TCI2], A2= [TCI1, TCI2, TCI3], and then configures a fixed time interval T=2, where the unit is a slot. The base station selects the TCI state set A1 through the MAC-CE signaling. After the above information is received, the UE updates the current received PDSCH TCI state to TCI0 according to an order of TCI states in A1, the UE automatically updates the current received PDSCH TCI state to TCI1 after two slots, and the UE automatically updates the current received PDSCH TCI state to TCI2 after two slots.

In this embodiment, the time unit and at least two spatial relation information sets are configured through the third high layer signaling, and one spatial relation information set of at least two spatial relation information sets is selected through the fourth high layer signaling, and spatial relation information which is in the selected spatial relation information set and corresponds to each transmission time is determined according to the time unit and the initial position. In this embodiment, the time unit is the update time interval, and the time unit set is the update time interval set. M spatial relation information sets are configured by the UE through the third high layer signaling (e.g. the RRC signaling), and the spatial relation information set includes N (N≥1) pieces of spatial relation information. The spatial relation information includes an uplink reference signal or a downlink reference signal for indicating an uplink channel or an uplink signal, respectively having a same spatial filter as the uplink reference signal, or for indicating an uplink channel or an uplink signal, respectively having a same spatial filter as the downlink reference signal. For example, a DM-RS of the PUSCH is configured with one piece of spatial relation information including an SRS for indicating that the PUSCH DM-RS and the SRS have the same spatial filter. A fixed update time interval T or an update time interval set T* is configured for the UE through the third high layer signaling (e.g. the MAC-CE signaling), and the update time interval set T* includes N−1 different update time intervals. An update time interval refers to a time interval between current spatial relation information and next spatial relation information updated by the UE. The UE is activated or indicates one of M spatial relation information sets (0≤n≤N−1); the UE sequentially updates spatial relation information of the downlink signal and/or sequentially updates spatial relation information of the downlink channel, alternatively, the UE sequentially updates spatial relation information of an uplink signal and/or sequentially updates spatial relation information of an uplink channel (including but not limited to the PUCCH, the PUSCH and the SRS) from a first spatial relation information in the indicated specified spatial relation information set. The time interval among each updating spatial relation information is obtained according to the configured fixed update time interval T or according to an update time interval value and order in the configured update time interval set T*.

Exemplarily, the base station configures two spatial relation information sets A1, A2, where A1=[Specialrelation-Info0, SpecialrelationInfo1, SpecialrelationInfo2], A2= [SpecialrelationInfo1, SpecialrelationInfo2, SpecialrelationInfo3], and then configures an update interval set T*32 [1, 2] through the MAC-CE signaling, where the unit is a slot. A spatial relation information set activated by the UE through the MAC-CE signaling is A2. After the above information is received, the UE updates the current transmitted PUCCH spatial relation information to first spatial relation information in the spatial relation information set, i.e. SpecialrelationInfo1, according to an order of spatial relation information in A2, the UE automatically updates the current transmitted PUCCH spatial relation information to SpecialrelationInfo2 after one slot, and the UE automatically updates the current transmitted PUCCH spatial relation information to SpecialrelationInfo3 after two slots.

In an embodiment, when a downlink channel and an uplink channel satisfy a channel reciprocity, the method further includes: configuring a spatial parameter for a PDSCH, where the spatial parameter is associated with at least the following configuration information: a source reference signal. The source reference signal is a reference signal of a first QCL type corresponding to a target downlink signal or a target downlink channel. The spatial parameter may be a TCI state.

In an embodiment, the base station configures the TCI state for the PDSCH, the TCI state refers to a TCI state configured by the base station for the UE to receive a target downlink signal or a target downlink channel, and the TCI state is associated with at least the following configuration information: the source reference signal. The source reference signal refers to the source reference signal of the first QCL type (such as QCL-Type D) corresponding to the target downlink signal or the target downlink channel, and indicates that the PDSCH and the source reference signal satisfy the quasi-co-address relationship with respect to QCL-Type D. When the downlink channel and the uplink channel satisfy the channel reciprocity, the UE may determine a reference signal in the spatial relation information of the uplink signal or the uplink channel from the source reference signal, that is, two reference signals have the same spatial filter.

FIG. 4 is a flowchart of another indication method according to an embodiment of the present application. This embodiment may be performed by the UE.

As shown in FIG. 4, the method in this embodiment includes S320 to S340.

In S320, SRI information is received from the base station.

The SRI information is used for indicating K SRS resource groups, spatial parameter information of an uplink information element set corresponds to spatial parameter information of a respective one of the K SRS resource groups, K is an integer greater than or equal to 1, and an uplink information element includes at least one of a PUSCH or one transmission of a plurality of PUSCH retransmissions.

In S340, A PUSCH transmission is performed according to the K SRS resource groups indicated by the SRI information.

In this embodiment, the base station configures the SRI information for the UE and transmits the SRI information to the UE. After the SRI information is received, the UE may perform the PUSCH transmission according to an SRS resource included in the SRS resource groups indicated by the SRI information.

FIG. 5 is a flowchart of another indication method according to an embodiment of the present application. This embodiment may be performed by the UE.

As shown in FIG. 5, the method in this embodiment includes S420 to S440.

In S420, a spatial parameter information set configured by a base station is received.

The spatial parameter information set includes a TCI state set or a spatial relation information set.

In S440, at least one of a spatial parameter of a physical channel or a spatial parameter of a physical signal is updated at the different transmission times according to the spatial parameter information set.

In this embodiment, the base station configures the spatial parameter information set for the UE, so that the UE can update of least one of the spatial parameter of the physical channel or the spatial parameter of the physical signal at different transmission times according to the spatial parameter information set. The physical channel includes at least one of a PDSCH, a PUSCH, a PDCCH or a PUCCH, and/or the physical signal includes at least one of an SRS or a CSI-RS. The spatial parameter information set includes a TCI state set or a spatial relation information set. In an embodiment, when the spatial parameter information set includes the TCI state set, the UE automatically updates at least one of the TCI state of the physical channel or the TCI state of the physical signal at different transmission times. In an embodiment, when the spatial parameter information set includes the spatial relation information set, the UE automatically updates at least one of the spatial relation information of the physical channel or the spatial relation information of the physical signal at different transmission times.

In an embodiment, when the downlink channel and the uplink channel satisfy the channel reciprocity, the method further include receiving a spatial parameter configured by a base station, where the spatial parameter is associated with at least the following configuration information: a source reference signal. The source reference signal is a reference signal of a first QCL type corresponding to a target downlink signal or a target downlink channel; and determining a first reference signal according to the source reference signal, where spatial parameter information of the uplink channel or a uplink signal is same as spatial parameter information of the first reference signal.

In this embodiment, when the downlink channel and the uplink channel satisfy the channel reciprocity, the base station configures the spatial parameter (e.g., TCI state) for the PDSCH, and the spatial parameter is associated with at least a source reference signal such that the UE determines the first reference signal from the source reference signal. The spatial parameter information of the uplink channel or the uplink signal is the same as that of the first reference signal, that is, the spatial filter is the same. The spatial parameter information includes at least one of transmission beam information, transmission beam group information, precoding matrix information, transport layer information, spatial relation information or spatial filter information. In this embodiment, the uplink channel or the uplink signal is identical to at least one spatial parameter information of the first reference signal, for example, the uplink channel or the uplink signal is identical to the transmission beam information of the first reference signal, and is identical to at least one of the transmission beam group information, the precoding matrix information, the transport layer information, the spatial relation information or the spatial filter information.

FIG. 6 is a structural diagram of an indication apparatus according to an embodiment of the present application. As shown in FIG. 6, the indication apparatus provided in this embodiment includes a first transmission module 520.

The first transmission module 520 is configured to transmit SRI information, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a PUSCH or one transmission of a plurality of PUSCH retransmissions.

The indication apparatus provided in this embodiment is configured to implement the indication method of the embodiment shown in FIG. 1. The implementation principle and effects of the indication apparatus provided in the embodiment are similar and are not repeated here.

In an embodiment, that the spatial parameter information of the each of the K uplink information element sets corresponds to the spatial parameter information of the respective one of the K SRS resource groups includes that spatial parameter information of an $i^{th}$ uplink information element set of the K uplink information element sets corresponds to spatial parameter information of an $i^{th}$ SRS resource group of the K SRS resource groups, where i=1, . . . , K.

In an embodiment, the SRI information includes one of an SRI index value and joint information of the SRI index value and a DMRS index value.

In an embodiment, that the SRI information is used for indicating the K SRS resource groups includes that an SRI index value in an SRI bit domain of DCI is used for indicating an SRS resource group corresponding to an $i^{th}$ uplink information element set, or an SRI index value in an SRI bit domain of DCI is used for indicating an $i^{th}$ uplink information element set corresponding to an $i^{th}$ SRS resource group, where i=1, . . . , K.

In an embodiment, the SRS resource group satisfies at least one of the characteristics described below.

Different uplink information element set corresponds to different SRS resource groups. The SRS resource group is associated with one of: spatial relation information and SRS resource serial number.

In an embodiment, the SRI information is used for indicating K SRS resource groups, and that the spatial parameter information of each of the uplink information element sets corresponds to the spatial parameter information of a respective one of the K SRS resource group includes at least one of that: the SRI index value is used for indicating the SRS resource corresponding to the first uplink information element set, and the SRS resource group corresponding to the second uplink information element set is acquired according to one of the following information: an SRS resource with the largest index ID except the SRS resource corresponding to the first uplink information element set indicated by the SRI index value, and an SRS resource with the smallest index ID except the SRS resource corresponding to the first uplink information element set indicated by the SRI index value, where the first uplink information element set and the second uplink information element set belong to K uplink information element sets, and K is an integer greater than or equal to 1.

In an embodiment, the SRI information is used for indicating K SRS resource groups, and that the spatial parameter information of each of the uplink information element sets corresponds to the spatial parameter information of a respective one of the K SRS resource group includes that the SRI index value indicates the SRS resource corresponding to the first uplink information element set, or a DMRS index value indicates the SRS resource corresponding to the second uplink information element set, where the first uplink information element set and the second uplink information element set belong to K uplink information element sets.

In an embodiment, indicating, by a DMRS index value, the SRS resource group corresponding to the second uplink information element set includes that the DMRS index value is used for indicating an offset of an index ID of the SRS resource corresponding to the second uplink information element set relative to an index ID of the SRS resource indicated by the SRI index value; or the DMRS index value is an index ID of the SRS resource corresponding to the second uplink information element set.

In an embodiment, the spatial parameter information includes at least one of transmission beam information, transmission beam group information, precoding matrix information, transport layer information, spatial relation information or spatial filter information.

In an embodiment, K uplink information element sets include at least one of a first uplink information element set or a second uplink information element set. The first uplink information element set includes one of a PUSCH transmission of which a PUSCH transmission indication value is less than or equal to a preset threshold, and a PUSCH transmission of which a PUSCH transmission indication value is an odd transmission indication value. The preset threshold value is half of a total number of PUSCH transmission indication values. The second uplink information element set includes one of a PUSCH transmission of which a PUSCH transmission indication value is greater than a preset threshold, and a PUSCH transmission of which a PUSCH transmission indication value is an even transmission indication value. The transmission indication value includes one of: a number of transmission and an index of the time unit.

Figure 7:
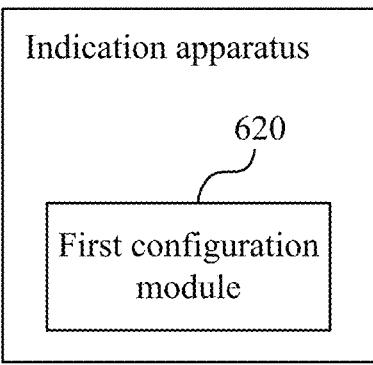
FIG. 7 is a structural diagram of another indication apparatus according to an embodiment of the present application.

FIG. 7 is a flowchart of another indication apparatus according to an embodiment of the present application. This embodiment may be performed by the UE. As shown in FIG. 7, the indication apparatus provided in this embodiment includes a first configuration module 620.

The first configuration module 620 is configured to configure a spatial parameter information set, where the spatial parameter information set is used for updating at least one of a spatial parameter of a physical channel or a spatial parameter of a physical signal at different transmission times, and the spatial parameter information set includes a TCI state set or a spatial relation information set.

The indication apparatus provided in this embodiment is configured to implement the indication method of the embodiment shown in FIG. 3. The implementation principle and effects of the indication apparatus provided in the embodiment are similar and are not repeated here.

In an embodiment, at least one of the spatial parameter of the physical channel or a spatial parameter of the physical signal is determined according to at least one of: an index of the time unit where the physical channel and/or the physical signal is located, or a mapping relationship between a spatial parameter and a time unit, where the spatial parameter includes one of: quasi-co-address reference signal information, spatial relation information or spatial filter information.

In an embodiment, that the spatial parameter information set is used for updating at least one of a spatial parameter of a physical channel or a spatial parameter of a physical signal at different transmission times includes that the spatial parameter information set is used for triggering the UE to update at least one of the spatial parameter of the physical channel or the spatial parameter of the physical signal in sequence according to the mapping relationship among the initial position, the spatial parameter and the time unit.

In an embodiment, the physical channel includes at least one of a PDSCH, a PUSCH, a PDCCH or a PUCCH, and/or the physical signal includes at least one of an SRS or a CSI-RS.

In an embodiment, a time unit is configured by first high layer signaling, and the time unit is used for determining an update interval of a spatial parameter in the spatial parameter information set, where the time unit includes a fixed time unit or a time unit set.

In an embodiment, one initial position is configured by second high layer signaling, and the initial position is used for determining an update initial position of a spatial parameter in the spatial parameter information set.

In an embodiment, a time unit and at least two spatial parameter information sets are configured by third high layer signaling, and the time unit includes a fixed time unit or a time unit set.

In an embodiment, one spatial parameter set of at least two spatial parameter sets is selected by fourth high layer signaling, and a spatial parameter which is in the selected spatial parameter set and corresponds to each transmission time is determined according to the time unit and the initial position.

In an embodiment, when a downlink channel and an uplink channel satisfy a channel reciprocity, the indication apparatus further include a second configuration module.

The second configuration module is configured to configure a spatial parameter for a PDSCH, where the spatial parameter is associated with the following configuration information: a source reference signal. The source reference signal is a reference signal of a first QCL type corresponding to a target downlink signal or a target downlink channel.

Figure 8:
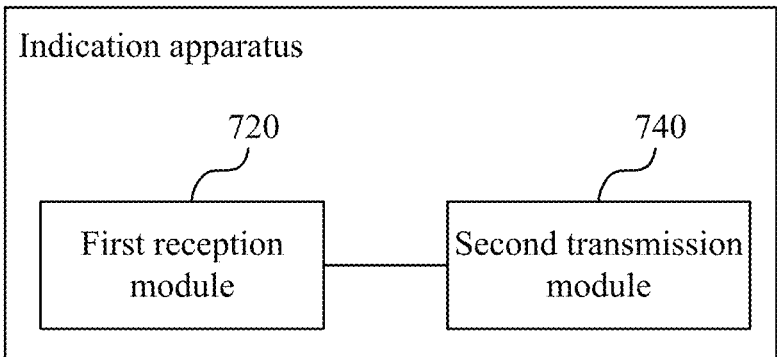
FIG. 8 is a structural diagram of another indication apparatus according to an embodiment of the present application.

FIG. 8 is a structural diagram of another indication apparatus according to an embodiment of the present application. As shown in FIG. 8, the indication apparatus provided in this embodiment includes a first reception module 720 and a second transmission module 740.

The first reception module 720 is configured to receive SRI information from a base station, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a PUSCH or one transmission of a plurality of PUSCH retransmissions.

The second transmission module 740 is configured to perform a PUSCH transmission according to the K SRS resource groups indicated by the SRI information.

The indication apparatus provided in this embodiment is configured to implement the indication method of the embodiment shown in FIG. 4. The implementation principle and effects of the indication apparatus provided in the embodiment are similar and are not repeated here.

Figure 9:
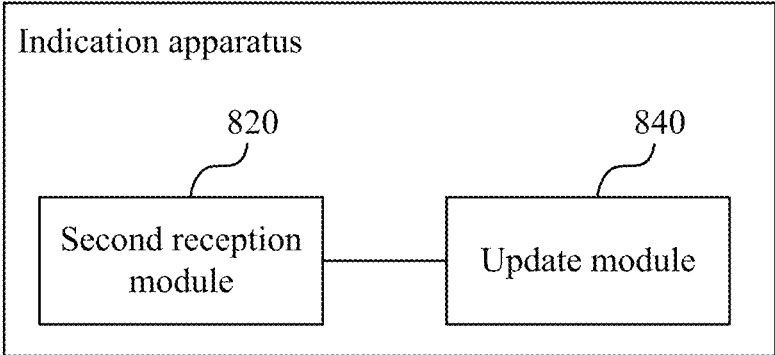
FIG. 9 is a structural diagram of another indication apparatus according to an embodiment of the present application.

FIG. 9 is a structural diagram of another indication apparatus according to an embodiment of the present application. As shown in FIG. 9, the indication apparatus provided in this embodiment includes a second reception module 820 and an update module 840.

The second reception module 820 is configured to receive a spatial parameter information set configured by a base station, where the spatial parameter information set includes a TCI state set or a spatial relation information set.

The update module 840 is configured to update at least one of a spatial parameter of a physical channel or a spatial parameter of a physical signal at the different transmission times according to the spatial parameter information set.

The indication apparatus provided in this embodiment is configured to implement the indication method of the embodiment shown in FIG. 5. The implementation principle and effects of the indication apparatus provided in the embodiment are similar and are not repeated here.

Figure 10:
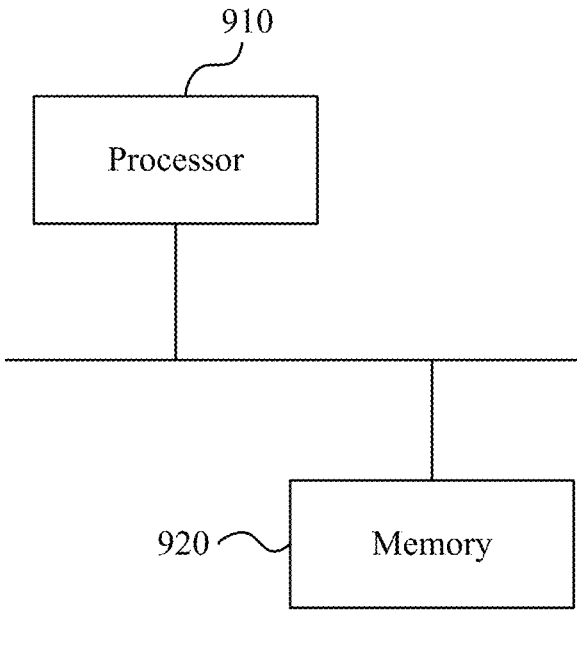
FIG. 10 is a structural diagram of a device according to embodiments of the present application.

FIG. 10 is a structural diagram of a device according to embodiments of the present application. As shown in FIG. 10, the device provided in the present application includes a processor 910 and a memory 920. The number of processors 510 in the equipment may be one or more, and FIG. 10 is illustrated by using an example in which there is one processor 910. The number of memories 520 in the equipment may be one or more, and FIG. 10 is illustrated by using an example in which there is one memory 920. The processor 910 and the memory 920 of the device are connected by a bus or in other manners, and FIG. 10 is illustrated by using an example of the connection by the bus. In the embodiment, the device is a base station.

The memory 920, as a computer-readable storage medium, may be configured to store software programs and computer executable programs and modules such as program instructions/modules corresponding to the equipment in any embodiment of the present application (such as a transmission module in the indication apparatus). The memory 920 may include a storage program region and a storage data region, where the storage program region may store an operating system and an application program required by at least one function, and the storage data region may store data created depending on the use of the device. Moreover, the memory 920 may include a high-speed random access memory, and may further include a nonvolatile memory such as at least one disk memory, flash memory or another nonvolatile solid state memory. In some examples, the memory 920 may include memories which are remotely disposed relative to the processor 910 and these remote memories may be connected to the device via a network. Examples of the preceding network include, but are not limited to, the Internet, an intranet, a local area network, a mobile communication network and a combination thereof.

The device provided above may be configured to execute the indication method applied to the base station and provided by any embodiment described above, and has corresponding functions and effects.

When the device is the UE, the program stored in the memory 920 may be a program instruction/module that corresponds to the indication method applied to the UE and provided in the embodiments of the present application. The processor 910 executes the software programs, instructions, and modules stored in the memory 920 so as to perform one or more function applications and data processing, that is, to implement the indication method described in the above method embodiments. When the above device is the UE, which may be configured to execute the indication method applied to the UE and provided by any embodiment of the present application, and has corresponding functions and effects.

An embodiment of the present application further provides a storage medium including a computer-executable instruction for executing an indication method when executed by a computer processor. The method is applied to a base station side, and the method includes transmitting sounding reference signal (SRS) resource indicator (SRI) information, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a physical uplink shared channel (PUSCH) or one transmission of a plurality of PUSCH retransmissions.

An embodiment of the present application further provides a storage medium including a computer-executable instruction for executing an indication method when executed by a computer processor. The method is applied to a base station side, and the method includes configuring a spatial parameter information set, where the spatial parameter information set is used for updating at least one of a spatial parameter of a physical channel or a spatial parameter of a physical signal at different transmission times, and the spatial parameter information set includes a TCI state set or a spatial relation information set.

An embodiment of the present application further provides a storage medium including a computer-executable instruction for executing an indication method when executed by a computer processor. The method is applied to a UE side, and the method includes receiving SRI information from a base station, where the SRI information is used for indicating K SRS resource groups, spatial parameter information of each of K uplink information element sets corresponds to spatial parameter information of a respective one of the K SRS resource groups, K is an integer greater than or equal to 1, and an uplink information element includes at least one of a physical uplink shared channel (PUSCH) or one transmission of a plurality of PUSCH retransmissions; and performing a PUSCH transmission according to the K SRS resource groups indicated by the SRI information.

An embodiment of the present application further provides a storage medium including a computer-executable instruction for executing an indication method when executed by a computer processor. The method is applied to a UE side, and the method includes receiving a spatial parameter information set configured by a base station, where the spatial parameter information set includes a transmission configuration indicator (TCI) state set or a spatial relation information set; and updating at least one of a spatial parameter of a physical channel or a spatial parameter of a physical signal at the different transmission times according to the spatial parameter information set.

The term user equipment encompasses any suitable type of wireless user equipment, such as a mobile phone, a portable data processing apparatus, a portable web browser, or an onboard mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, though the present application is not limited thereto.

Embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable to the local technical environment and may be implemented using any suitable data storage technology such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An indication method, performed by a base station, comprising:

configuring one or more spatial parameter information sets, wherein each of the one or more spatial parameter information sets is used for a user equipment to update spatial parameter of at least one of a physical channel or a physical signal at different transmission times, and each of the one or more spatial parameter information sets comprises a transmission configuration indicator (TCI) state set or a spatial relation information set; and sending the one or more spatial parameter information sets to the user equipment;

wherein the spatial parameter of at least one of the physical channel or the physical signal is determined by the user equipment according to:

an initial position which is used for determining an initial spatial parameter of the initial position in one spatial parameter information set of the one or more spatial parameter information sets; and, a time interval which is used for determining an update time interval of the spatial parameter in the one spatial parameter information set;

wherein the indication method further comprises:

configuring high layer signaling, wherein the one spatial parameter information set is selected by the user equipment through the high layer signaling, and a spatial parameter corresponding to each of the different transmission times determined by the user equipment from the one selected spatial parameter information set according to the time interval and the initial position; and wherein in response to the one spatial parameter information set being the spatial relation information set, and the spatial parameter being spatial relation information, configuring the high layer signaling comprises:

configuring third higher layer signaling and fourth higher layer signaling, wherein the update time interval and at least two spatial relation information sets are selected by the user equipment through the third higher layer signaling; one spatial relation information set is selected from the at least two spatial relation information sets by the user equipment through the fourth higher layer signaling; and spatial relation information corresponding to each of the different transmission times is determined by the user equipment from the one selected spatial relation information set according to the update time interval and the initial position.

2. The indication method of claim 1, wherein configuring the high layer signaling further comprises:

configuring first high layer signaling, wherein the time interval is configured by the first high layer signaling, and the time interval comprises a fixed time interval or a time interval set.

3. The indication method of claim 1, wherein configuring the high layer signaling further comprises:

configuring second high layer signaling, wherein the initial position is configured by the second high layer signaling.

4. The indication method of claim 1, wherein in a case where a downlink channel and an uplink channel satisfy a channel reciprocity, the indication method further comprises:

configuring a spatial parameter for a physical downlink shared channel (PDSCH), wherein the spatial parameter configured for the PDSCH is associated with the following configuration information: a source reference signal, wherein the source reference signal is a reference signal of a first quasi-co-location (QCL) type corresponding to a target downlink signal or a target downlink channel.

5. A non-transitory computer-readable storage medium storing a computer program, wherein the computer program, when executed by a processor, causes the processor to perform the indication method according to claim 1.

6. The indication method of claim 1, wherein the spatial parameter of at least one of the physical channel or the physical signal is further determined by the user equipment according to:

a mapping relationship between the spatial parameter and the time interval, wherein the spatial parameter comprises one of: quasi-co-address reference signal information, spatial relation information or spatial filter information, wherein the mapping relationship comprises one or more update intervals of the spatial parameter in the spatial parameter information set.

7. The indication method of claim 6, wherein the indication method further comprises:

the one spatial parameter information set of the one or more spatial parameter information sets being used for triggering the user equipment to sequentially update at least one of the spatial parameter of the physical channel or sequentially update the spatial parameter of the physical signal according to the initial position and the mapping relationship between the spatial parameter and the time interval.

8. An indication method, performed by a user equipment, comprising:

receiving one or more spatial parameter information sets configured by a base station, wherein each of the one or more spatial parameter information sets comprises a transmission configuration indicator (TCI) state set or a spatial relation information set; and updating a spatial parameter of at least one of a physical channel or a physical signal at different transmission times according to the one or more spatial parameter information sets;

wherein the spatial parameter of at least one of the physical channel or the physical signal is determined by the user equipment according to:

an initial position which is used for determining an initial spatial parameter of the initial position in one spatial parameter information set of the one or more spatial parameter information sets; and, a time interval which is used for determining an update time interval of the spatial parameter in the one spatial parameter information set;

wherein the indication method further comprises:

receiving high layer signaling configured by the base station;

selecting the one spatial parameter information set through the high layer signaling; and determining a spatial parameter corresponding to each of the different transmission times from the one selected spatial parameter information set according to the time interval and the initial position; and wherein in response to the one spatial parameter information set being the spatial relation information set, and the spatial parameter being spatial relation information, receiving the high layer signaling configured by the base station comprises receiving third higher layer signaling and fourth higher layer signaling configured by the base station, selecting the one spatial parameter information set through the high layer signaling comprises selecting the update time interval and at least two spatial relation information sets through the third higher layer signaling, and selecting one spatial relation information set from the at least two spatial relation information sets through the fourth higher layer signaling;

determining the spatial parameter corresponding to each of the different transmission times from the one selected spatial parameter information set according to the time interval and the initial position comprises determining spatial relation information corresponding to each of the different transmission times from the one selected spatial relation information set according to the update time interval and the initial position, and updating the spatial parameter of at least one of the physical channel or the physical signal at the different transmission times according to the one or more spatial parameter information sets comprises updating the spatial relation information of at least one of the physical channel or the physical signal at the different transmission times according to the determined spatial relation information corresponding to each of the different transmission times.

9. The indication method of claim 8, wherein in a case where a downlink channel and an uplink channel satisfy a channel reciprocity, the indication method further comprises:

receiving a spatial parameter configured by the base station, wherein the spatial parameter configured by the base station is associated with the following configuration information: a source reference signal, and the source reference signal is a reference signal of a first quasi-co-location (QCL) type corresponding to a target downlink signal or a target downlink channel; and determining a first reference signal according to the source reference signal, wherein spatial parameter information of the uplink channel or a uplink signal is same as spatial parameter information of the first reference signal.

10. An indication apparatus, comprising a processor and a memory for storing execution instructions that when executed by the processor cause the processor to perform the indication method of claim 8.

11. The indication apparatus of claim 10, wherein the execution instructions that when executed by the processor cause the processor to further receive a spatial parameter configured by the base station, wherein the spatial parameter configured by the base station the following configuration information: a source reference signal, and the source reference signal is a reference signal of a first quasi-co-location (QCL) type corresponding to a target downlink signal or a target downlink channel; and determine a first reference signal according to the source reference signal, wherein spatial parameter information of the uplink channel or a uplink signal is same as spatial parameter information of the first reference signal.

12. A non-transitory computer-readable storage medium storing a computer program, wherein the computer program, when executed by a processor, causes the processor to perform the indication method according to claim 8.

13. An indication apparatus, comprising a processor and a memory for storing execution instructions that when executed by the processor cause the processor to configure one or more spatial parameter information sets, wherein each of the one or more spatial parameter information sets is used for a user equipment to update a spatial parameter of at least one of a physical channel or a physical signal at different transmission times, and each of the one or more the spatial parameter information sets comprises a transmission configuration indicator (TCI) state set or a spatial relation information set; and when executed by the processor cause the processor to send the one or more spatial parameter information sets to the user equipment;

wherein the spatial parameter of at least one of the physical channel or the physical signal is determined by the user equipment according to:

an initial position which is used for determining an initial spatial parameter of the initial position in one spatial parameter information set of the one or more spatial parameter information sets; and, a time interval which is used for determining an update time interval of the spatial parameter in the one spatial parameter information set;

wherein the execution instructions that when executed by the processor cause the processor to further configure high layer signaling, wherein the one spatial parameter information set is selected by the user equipment through the high layer signaling, and a spatial parameter corresponding to each of the different transmission times is determined by the user equipment from the one selected spatial parameter information set according to the time interval and the initial position; and wherein in response to the one spatial parameter information set being the spatial relation information set, and the spatial parameter being spatial relation information, the execution instructions that when executed by the processor cause the processor to further configure third higher layer signaling and fourth higher layer signaling, wherein the update time interval and at least two spatial relation information sets are selected by the user equipment through the third higher layer signaling; one spatial relation information set is selected from the at least two spatial relation information sets by the user equipment through the fourth higher layer signaling; and spatial relation information corresponding to each of the different transmission times is determined by the user equipment from the one selected spatial relation information set according to the update time interval and the initial position.

14. The indication apparatus of claim 13, wherein the execution instructions that when executed by the processor cause the processor to further configure first high layer signaling, the time interval is configured by the first high layer signaling, and the time interval comprises a fixed time interval or a time interval set.

15. The indication apparatus of claim 13, wherein the execution instructions that when executed by the processor cause the processor to further configure second high layer signaling, the initial position is configured by the second high layer signaling.

16. The indication apparatus of claim 13, wherein in a case where a downlink channel and an uplink channel satisfy a channel reciprocity, the processor is further configured to configure a spatial parameter for a physical downlink shared channel (PDSCH), wherein the spatial parameter configured for the PDSCH is associated with the following configuration information: a source reference signal, wherein the source reference signal is a reference signal of a first quasico-location (QCL) type corresponding to a target downlink signal or a target downlink channel.

17. The indication apparatus of claim 13, wherein the spatial parameter of at least one of the physical channel or the physical signal is further determined by the user equipment according to:

a mapping relationship between the spatial parameter and the time interval, wherein the spatial parameter comprises one of: quasi-co-address reference signal information, spatial relation information or spatial filter information, wherein the mapping relationship comprises one or more update intervals of the spatial parameter in the spatial parameter information set.

18. The indication apparatus of claim 17, wherein the one spatial parameter information set of the one or more spatial parameter information sets being used for triggering the user equipment to sequentially update at least one of the spatial parameter of the physical channel or sequentially update the spatial parameter of the physical signal according to the initial position and the mapping relationship between the spatial parameter and the time interval.

* * * * *